(12) United States Patent
Wang

(10) Patent No.: US 7,561,130 B2
(45) Date of Patent: Jul. 14, 2009

(54) SOLAR POWERED STREET-LAMP CONTROL CIRCUIT

(75) Inventor: Chia-Hung Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 41 days.

(21) Appl. No.: 11/693,721

(22) Filed: Mar. 30, 2007

(65) Prior Publication Data

US 2008/0143295 A1 Jun. 19, 2008

(30) Foreign Application Priority Data

Dec. 15, 2006 (CN) .......................... 2006 1 0201308

(51) Int. Cl.
 G09G 3/32 (2006.01)
 G05F 1/10 (2006.01)

(52) U.S. Cl. .................. 345/82; 345/212; 345/213; 345/214; 345/46; 327/536; 327/537; 327/535; 327/540

(58) Field of Classification Search .................. 315/247, 315/246, 224, 225, 291, 307, 312–326, 185 S, 315/200 A; 345/212, 213, 214, 211, 46, 345/82; 327/536, 537, 535, 540, 541, 543, 327/530, 66, 53
See application file for complete search history.

(56) References Cited

U.S. PATENT DOCUMENTS 5,652,755 A * 7/1997 Carey .......................... 714/811
6,784,357 B1    8/2004 Wang

* cited by examiner

*Primary Examiner*—Tuyet Vo
(74) *Attorney, Agent, or Firm*—Frank R. Niranjan

(57) ABSTRACT

A control circuit for regulating current supplied from a power source to at least one load. The control circuit has a current mirror circuit electrically coupled between the power source and the at least one load, and being capable of regulating current supplied from the power source to the at least one load at different levels; a real-time clock (RTC) circuit adapted for recording real time; and a micro control unit (MCU) electrically coupled between the RTC circuit and the current mirror circuit, and configured such that when the real time changes from a first time period to a second time period, the MCU generates control signals to trigger the current mirror circuit to regulate current supplied from the power source to the at least one load from a first level corresponding to the first time period to a second level corresponding to the second time period.

23 Claims, 2 Drawing Sheets

SOLAR POWERED STREET-LAMP CONTROL CIRCUIT

BACKGROUND OF THE INVENTION

1. Field of the Invention

The present invention relates to solar powered street-lamps, and particularly to a control circuit capable of automatically controlling brightness of a solar powered street-lamp according to an environmental condition.

2. Description of Related Art

Nowadays, with the earth resources being depleted day by day, the cost of investment for energy increases significantly. Solar energy has drawn great attention from the energy industry as an alternative source of energy, and has found widespread applications in a variety of fields. For example, solar powered street-lamps are used in many countries.

A conventional solar powered street-lamp typically includes a solar energy operated absorption board, a storage battery, and a lamp. The solar energy operated absorption board absorbs solar energy and converts it into electric energy, which is used to recharge the storage battery. The storage battery supplies power to the lamp. However, the lamp typically works at a constant maximum current, i.e., the brightest state at all times. Therefore, the conventional solar powered street-lamp unnecessarily consumes a great deal of energy, thereby increasing costs and shortening its life span.

What is needed is a solar powered street-lamp control circuit for automatically controlling the brightness of the street-lamp according to environmental conditions.

SUMMARY OF THE INVENTION

In one aspect, the present invention relates to a control circuit for regulating current supplied from a source of power to at least one load. In one embodiment, the source of power is a storage battery rechargeable from a solar energy operated absorption board. The at least one load includes at least one street lamp. In one embodiment, the control circuit has a current mirror circuit electrically coupled between the source of power and the at least one load, and being capable of regulating current supplied from the source of power to the at least one load at different levels; a real-time clock (RTC) circuit adapted for recording real time; and a micro control unit (MCU) electrically coupled between the RTC circuit and the current mirror circuit, and configured such that when the real time changes from a first time period to a second time period, the MCU generates one or more control signals to trigger the current mirror circuit to regulate current supplied from the source of power to the at least one load from a first level corresponding to the first time period to a second level corresponding to the second time period.

In one embodiment, the current mirror circuit has a resistor having a first terminal and a second terminal, wherein the first terminal is connected to the source of power and a first terminal of the at least one load, and a first transistor having a base, a collector, and an emitter, wherein the collector is electrically coupled to both the base and the second terminal of the resistor, and the emitter is grounded. The current mirror circuit has N second transistors, N being a positive integer. Each second transistor has a base, a collector, and an emitter. The base of each second transistor is electrically coupled to the base of the first transistor, and the collector of each second transistor is electrically coupled to a port that is electrically coupled to a second terminal of the at least one load. Furthermore, the current mirror circuit has N electric switch elements, each electric switch element having a gate, a source, and a drain, wherein the drain of each electric switch element is electrically coupled to the emitter of a corresponding second transistor, and the source of each electric switch element is electrically coupled to a port that is grounded, and the gate of each electric switch element is electrically coupled to a corresponding output port of the MCU. In one embodiment, N=4. Each of the first transistor and the N second transistors is an NPN transistor. Each electric switch element is an N-MOS transistor.

In one embodiment, the generated one or more control signals are output to the gates of corresponding one or more electric switch elements to individually turn on or turn off the corresponding one or more electric switch elements. The current, I0, supplied from the source of power to the at least one load is regulated according to a formula:

$$I0 = M*[(V-Vbe)/R]*[\beta/(\beta+1+M)],$$

wherein R is a resistance of the resistor, V is a voltage of the source of power, Vbe is a voltage difference between the base and the emitter of the first transistor, β is a gain of each second transistor, and M=0, 1, 2, ... N is the amount of electric switch elements turned on.

In another aspect, the present invention relates to a solar powered street-lamp system. In one embodiment, the solar powered street-lamp system includes a storage battery rechargeable from a solar energy operated absorption board, and at least one lamp. In one embodiment, the at least one lamp has a plurality of light-emitting diodes (LEDs). The solar powered street-lamp system further includes a current mirror circuit electrically coupled between the storage battery and the at least one lamp, and being capable of regulating current supplied from the storage battery to the at least one lamp at different levels, an RTC circuit adapted for recording the real time, and an MCU electrically coupled between the RTC circuit and the current mirror circuit, and configured such that when the real time changes from a first time period to a second time period, the MCU generates one or more control signals to trigger the current mirror circuit to regulate current supplied from the source of power to the at least one load from a first level corresponding to the first time period to a second level corresponding to the second time period.

In yet another aspect, the present invention relates to a control circuit for regulating current supplied from a source of power to at least one load to operate in an area thereof responsive to an environmental condition in the area. The source of power has an anode and a cathode being grounded, and is rechargeable from a solar energy operated absorption board. The at least one load has a first terminal electrically coupled to the anode of the source of power and a second terminal. In one embodiment, the at least one load comprises at least one street lamp. The environmental condition comprises a plurality of states. Each state of the environmental condition is associated with a corresponding period of time in a day.

In one embodiment, the control circuit comprises a current mirror circuit. The current mirror circuit includes a resistor having a first terminal and a second terminal, wherein the first terminal is connected to the anode of the source of power; a first transistor having a base, a collector, and an emitter, wherein the collector is electrically coupled to both the base and the second terminal of the resistor, and the emitter is grounded; N second transistors, N being a positive integer, each second transistor having a base, a collector, and an emitter, wherein the base of each second transistor is electrically coupled to the base of the first transistor, and the collector of each second transistor is electrically coupled to a port that is electrically coupled to the second terminal of the at least one load; and N electric switch elements, each electric switch element having a gate, a source, and a drain, wherein the drain of each electric switch element is electrically coupled to the emitter of a corresponding second transistor, and the source of each electric switch element is electrically coupled to a port that is grounded.

Furthermore, the control circuit comprises an MCU at least having N output ports, wherein each output port is electrically coupled to the gate of a corresponding electric switch element, and wherein the MCU is configured such that when the environmental condition in the area changes from one state to another state, the MCU generates one or more control signals selectively outputting to the gates of corresponding one or more electric switch elements to individually turn on or turn off the corresponding one or more electric switch elements, thereby regulating current supplied from the source of power to the at least one load responsive to the environmental condition in the area.

Additionally, the control circuit comprises a timer coupled to the MCU and configured to record the real time in the area, thereby identifying a state of the environmental condition thereof.

These and other aspects of the present invention will become more apparent from the following detailed description of the preferred embodiments taken in conjunction with the accompanying drawings, although variations and modifications therein may be affected without departing from the spirit and scope of the novel concepts of the disclosure.

DETAILED DESCRIPTION OF THE INVENTION

The description will be made as to the embodiments of the present invention in conjunction with the accompanying drawings in FIGS. 1 and 2. In accordance with the purposes of this invention, as embodied and broadly described herein, this invention, in one aspect, relates to a control circuit for regulating current supplied from a source of power to at least one load to operate in an area thereof responsive to an environmental condition in the area. In one embodiment, the source of power is a storage battery rechargeable from a solar energy operated absorption board. The at least one load is a street-lamp. The environmental condition may correspond to the time when the street-lamp operates. Accordingly, the control circuit is adapted for controlling the brightness of the solar powered street-lamp according to the time when the solar powered street-lamp operates.

Figure 1:
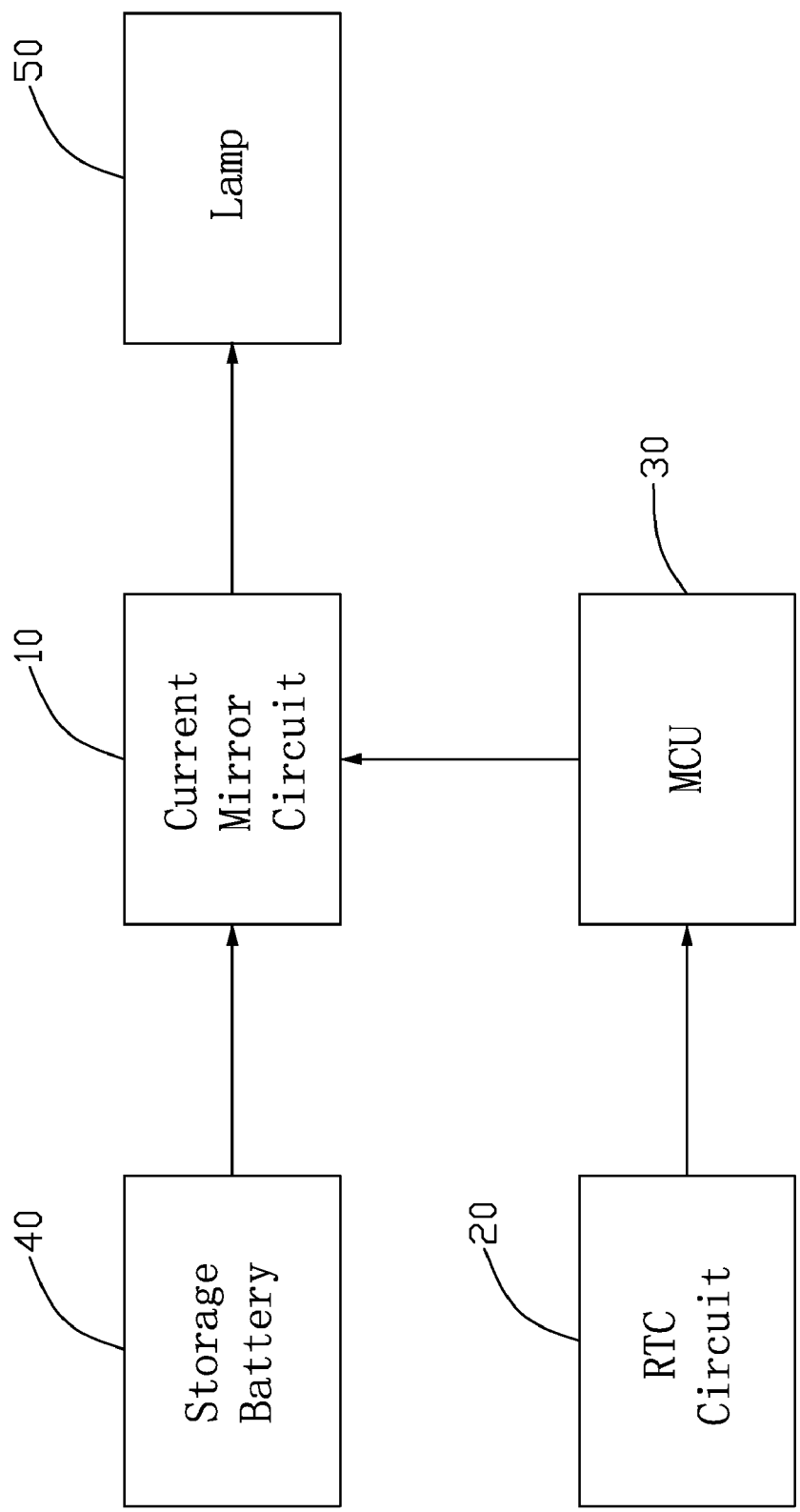
FIG. 1 is a block diagram of a solar powered street-lamp control circuit according to one embodiment of the present invention.
Figure 2:
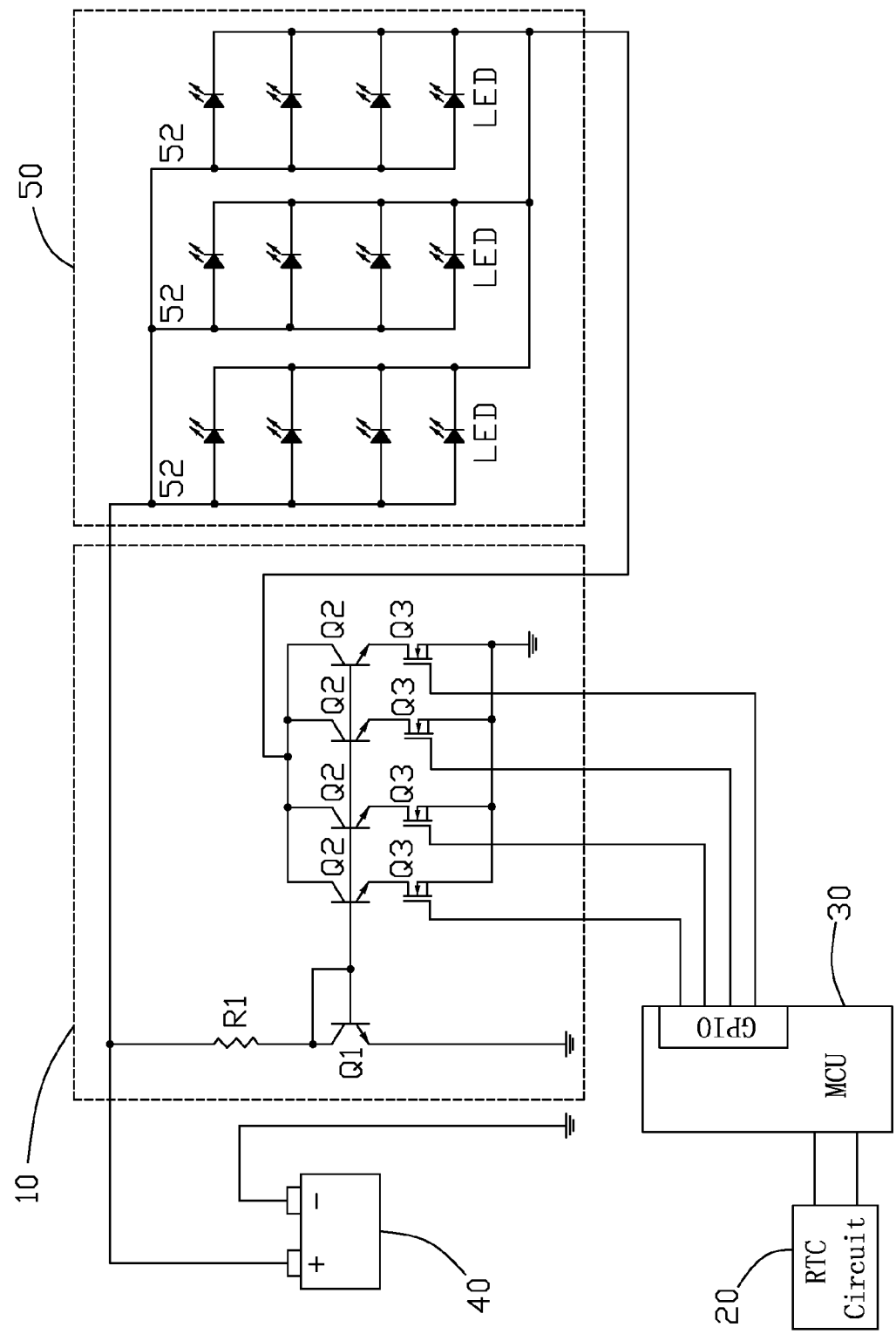
FIG. 2 is a circuit diagram of FIG. 1.

Referring to FIGS. 1 and 2, a solar powered street-lamp control circuit in accordance with a preferred embodiment of the present invention is provided for controlling brightness of a solar powered street-lamp having a lamp 50 with power supplied from a storage battery 40. The control circuit includes a current mirror circuit 10, an RTC circuit 20, and an MCU 30. The storage battery 40 supplies power to the lamp 50 of the solar powered street-lamp via the current mirror circuit 10. The MCU 30 controls current of the lamp 50 from the current mirror circuit 10 according to the RTC circuit 20, thereby controlling brightness of the lamp 50. In this embodiment, the storage battery 40 is rechargeable from a solar energy operated absorption board (not shown). The lamp 50 includes twelve LEDs, where each four LEDs are connected in parallel to form a parallel circuit 52. The three parallel circuits 52 are connected in parallel. Other numbers of LEDs and/or types of electric load(s) can also be utilized in same or different configurations to practice the present invention.

In this exemplary embodiment, the current mirror circuit 10 includes a resistor R1 having two terminals, a first transistor Q1, four second transistors Q2, and four electric switch elements Q3. Each of the first transistor Q1 and the four second transistors Q2 has a base, a collector, and an emitter. Each of the four electric switch elements Q3 has a gate, a source and a drain. The first transistor Q1 and second transistors Q2 are NPN transistors. The electric switch elements Q3 are N-MOS transistors. Other numbers and types of the transistors and electric switch elements can also be utilized to practice the present invention.

The storage battery 40 has a cathode that is grounded, and an anode that is electrically coupled to an anode of the lamp 50. The anode of the storage battery 40 is also electrically coupled to one terminal of the resistor R1. The other terminal of the resistor R1 is electrically coupled to the collector of the first transistor Q1. The emitter of the first transistor Q1 is grounded, and the base of the first transistor Q1 is electrically coupled to the collector of the first transistor Q1. Additionally, the base of the first transistor Q1 is also electrically coupled to the base of each second transistor Q2. The collectors of the second transistors Q2 are electrically coupled together and then electrically coupled to a cathode of the lamp 50. The emitter of each second transistor Q2 is electrically coupled to the drain of a corresponding electric switch element Q3. The sources of the electric switch elements Q3 are grounded. The gate of each electric switch element Q3 is electrically coupled to a corresponding general purpose input/output (GPIO) pin of the MCU 30. If one of the GPIO pins of the MCU 30 outputs a high voltage control signal to the corresponding electric switch element Q3, the corresponding electric switch element Q3 will be turned on. If one of the GPIO pins of the MCU 30 outputs a low voltage control signal to the corresponding electric switch element Q3, the corresponding electric switch element Q3 will be turned off. In operation, the MCU 30 generates one or more control signals according to an environmental condition such as the time when the street-lamp operates. The generated one or more control signals are output into the gates of corresponding one or more electric switch elements Q3 to turn on or turn off (i.e., control work status of) the one or more electric switch elements Q3, thereby regulating the current supplied from the storage battery 40 to the lamp 50. The RTC circuit 20 is electrically coupled to the MCU 30 for recording the real time when the street-lamp operates and supplying the recorded real-time clock signals thereto. Thus, in the embodiment as shown in FIGS. 1 and 2, the RTC circuit 20 records real time and supplies a real-time clock signal to the MCU 30, which in turn generates one or more control signals accordingly.

For example, when the MCU 30 responsively generates control signals (i.e., the four GPIO pins of the MCU 30 all output high voltage control signals) to turn all the four electric switch elements Q3 on, the following relationships are satisfied:

$I = (V - Vbe)/R;$ $I1 = I2 = I3 = I4 = I^*[\beta/(\beta+1+4)];$ and $$I0=I1+I2+I3+I4.$$

Then $I0=4[(V-Vbe)/R]*[\beta/(\beta+1+4)]$, where R is a resistance of the resistor R1, I is a current passing from the resistor R1, V is a voltage of the storage battery 40, Vbe is a voltage difference between the base and emitter of the first transistor Q1, I1-I4 are current passing from the collectors of the four second transistors Q2, respectively, I0 is a regulated current passing from the lamp 50, β is a gain of each second transistor Q2.

When the MCU 30 responsively generates control signals (i.e., three of the four GPIO pins of the MCU 30 output high voltage control signals, the other one GPIO pin of the MCU 30 outputs low voltage control signal) to turn three of the four electric switch elements Q3 on, the regulated current I0 passing from the lamp 50 is obtained in the form of:

$$I0=3[(V-Vbe)/R]*[\beta/(\beta+1+3)].$$

When the MCU 30 responsively generates control signals (i.e., two of the four GPIO pins of the MCU 30 output high voltage control signals, the other two GPIO pins of the MCU 30 output low voltage control signals) to turn two of the four electric switch elements Q3 on, the regulated current I0 passing from the lamp 50 is obtained in the form of:

$$I0=2[(V-Vbe)/R]*[\beta/(\beta+1+2)].$$

When the MCU 30 responsively generates control signals (i.e., one of the four GPIO pins of the MCU 30 outputs high voltage control signal, the other three GPIO pins of the MCU 30 output low voltage control signals) to turn one of the four electric switch elements Q3 on, the regulated current I0 passing from the lamp 50 is obtained in the form of:

$$I0=[(V-Vbe)/R]*[\beta/(\beta+1+1)].$$

When the MCU 30 responsively generates control signals (i.e., the four GPIO pins of the MCU 30 all output low voltage control signals) to turn all the four electric switch elements Q3 off, the regulated current I0=0.

In general, for a control circuit having one first transistor, N second transistors Q2 and N electric switch elements Q3, the current, I0, supplied from the source of power to the at least one load is regulated in the form of:

$$I0=M*[(V-Vbe)/R]*[\beta/(\beta+1+M)],$$

where R is a resistance of the resistor, V is a voltage of the source of power, Vbe is a voltage difference between the base and the emitter of the first transistor, β is a gain of each second transistor, and M=0, 1, 2, . . . N is the amount of which electric switch elements are turned on.

In the embodiment as shown in FIGS. 1 and 2, the brightness of the lamp 50 can be characterized with three brightness states, which are a first brightness state, a second brightness state, and a third brightness state, respectively, and a darkness state. The brightness of the lamp 50 when it operates at the first brightness state is brighter than that of the second brightness state which, in turn, is brighter than that of the third brightness state. When the brightness of the lamp 50 is in the darkness state, the lamp 50 emits no light. Specifically, when all of the four electric switch elements Q3 are turned on, the lamp 50 operates at the first brightness state. When three of the four electric switch elements Q3 are turned on, the lamp 50 operates at the second brightness state. When two of the four electric switch elements Q3 are turned on, the lamp 50 operates at the third brightness state. When all of the four electric switch elements Q3 are turned off, the lamp 50 operates at the darkness state. Each state may be associated with a period of time when the lamp 50 operates. For examples, the first brightness state, the second brightness state, the third brightness state, and the darkness state may correspond to the brightness of the lamp 50 operating at different time periods of a day: 19:00-01:30, 01:30-04:00, 04:00-05:30, and 05:30-19:00, respectively.

In one embodiment, the MCU 30 is programmably configured such that when the time is at 05:30, which is recorded by the RTC circuit 20 and the RTC circuit 20 supplies a corresponding real-time clock signal to the MCU 30, the MCU 30 accordingly transmits a control signal to the electric switch elements Q3 via the GPIO pins of the MCU 30 to turn all the electric switch elements Q3 off, the lamp 50 works at the darkness state and continuously works at this state until 19:00. When the time is at 19:00, which is recorded by the RTC circuit 20 and the RTC circuit 20 supplies a corresponding real-time clock signal to the MCU 30, the MCU 30 accordingly transmits a control signal to the electric switch elements Q3 via the GPIO pins of the MCU 30 to turn all the electric switch elements Q3 on, the lamp 50 transits from the darkness state to work at the first brightness state and continuously works at this state until 01:30. When the time is at 01:30, which is recorded by the RTC circuit 20 and the RTC circuit 20 supplies a corresponding real-time clock signal to the MCU 30, the MCU 30 accordingly transmits a control signal to the electric switch elements Q3 via the GPIO pins of the MCU 30 to turn three of the electric switch elements Q3 on, the lamp 50 transits from the first brightness state to work at the second brightness state and continuously works at this state until 04:00. When the time is at 04:30, which is recorded by the RTC circuit 20 and the RTC circuit 20 supplies a corresponding real-time clock signal to the MCU 30, the MCU 30 accordingly transmits a control signal to the electric switch elements Q3 via the GPIO pins of the MCU 30 to turn two of the electric switch elements Q3 on, the lamp 50 transits from the second brightness state to work at the third brightness state and continuously works at this state until 05:30. Then another working circle begins. Accordingly, the solar powered street-lamp saves energy effectively, and prolongs life span thereof.

The configuration of the MCU 30 as disclosed above can be changed and/or adjusted according to some other environmental conditions such as weather, season, locality and so on. The brightness states of the lamp 50 can also be adjusted via selecting properly the resistance of the resistor, the amount of the second transistors Q2, and the gain of the second transistors Q2. Additionally, according to the present invention, the source of power can be any types of power sources, a solar-powered battery, a non-solar powered battery, or the like. The at least one load can also be a room lamp, an appliance, or the like.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A control circuit for regulating current supplied from a source of power to at least one load, comprising:
    a. a current mirror circuit electrically coupled between the source of power and the at least one load for, regulating current supplied from the source of power to the at least one load at different levels;
    b. a real-time clock (RTC) circuit adapted for recording real time; and
    c. a micro control unit (MCU) electrically coupled between the RTC circuit and the current mirror circuit, and configured such that when the real time changes from a first time period to a second time period, the MCU generates one or more control signals to trigger the current mirror circuit to regulate current supplied from the source of power to the at least one load from a first level corresponding to the first time period to a second level corresponding to the second time period;
wherein the current mirror circuit comprises:
    d. a resistor having a first terminal and a second terminal, wherein the first terminal connected to the source of power and a first terminal of the at least one load;
    e. a first transistor having a base, a collector and an emitter, wherein the collector electrically coupled to both the base and the second terminal of the resistor, and the emitter is grounded;
    f. N second transistors, N being a positive integer, each second transistor having a base, a collector and an emitter, wherein the base of each second transistor is electrically coupled to the base of the first transistor, and the collector of each second transistor is electrically coupled to a port that is electrically coupled to a second terminal of the at least one load; and
    g. N electric switch elements, each electric switch element having a gate, a source and a drain, wherein the drain of each electric switch element is electrically coupled to the emitter of a corresponding second transistor, and the source of each electric switch element is electrically coupled to a port that is grounded, and the gate of each electric switch element is electrically coupled to a corresponding output port of the MCU.

2. The control circuit as claimed in claim 1, wherein each of the first transistor and the N second transistors is an NPN transistor.

3. The control circuit as claimed in claim 1, wherein each electric switch element is an N-MOS transistor.

4. The control circuit as claimed in claim 1, wherein N=4.

5. The control circuit as claimed in claim 1, wherein the source of power is a storage battery rechargeable from a solar energy operated absorption board.

6. The control circuit as claimed in claim 1, wherein the at least one load comprises at least one street lamp.

7. The control circuit as claimed in claim 1, wherein the generated one or more control signals are output to the gates of corresponding one or more electric switch, elements to individually turn on or turn off the corresponding one or more electric switch elements.

8. The control circuit as claimed in claim 7, wherein the current, 9, supplied from the source of power to the at least one load is regulated in the form of:

$$I0=M*[(V-Vbe)/R]*[\beta/(\beta+1+M)],$$

wherein R is a resistance of the resistor, V is a voltage of the source of power, Vbe is a voltage difference between the base and the emitter of the first transistor, β is a gain of each second transistor, and M=0, 1, 2, . . . N is the amount of which electric switch elements are turned on.

9. A solar powered street-lamp system, comprising:
    a. a storage battery rechargeable from a solar energy operated absorption board;
    b. at least one lamp;
    c. a current mirror circuit electrically coupled between the storage battery and the at least one lamp, and being capable of regulating current supplied from the storage battery to the at least one lamp at different levels;
    d. a real-time clock (RTC) circuit adapted for recording real time; and
    e. a micro control unit (MCU) electrically coupled between the RTC circuit and the current mirror circuit, and configured such that when the real time changes from a first time period to a second time period, the MCU generates one or more control signals to trigger the current mirror circuit to regulate current supplied from the storage battery to the at least one lamp from a first level corresponding to the first time period to a second level corresponding to the second time period;
wherein the mirror circuit comprises:
    f. a resistor having a first terminal and a second terminal, wherein the first terminal is connected to the storage battery;
    g. a first transistor having a base, a collector and an emitter, wherein the collector is electrically coupled to both the base and the second terminal of the resistor, and the emitter is grounded;
    h. N second transistors, N being a positive integer, each second transistor having a base, a collector and an emitter, wherein the base of each second transistor is electrically coupled to the base of the first transistor, and the collector of each second transistor is electrically coupled to a port that is electrically coupled to the second terminal of the at least one lamp; and
    i. N electric switch elements, each electric switch element having a gate, a source and a drain, wherein the drain of each electric switch element is electrically coupled to the emitter of a corresponding second transistor, and the source of each electric switch element is electrically coupled to a port that is grounded, and the gate of each electric switch element is electrically coupled to a corresponding output port of the MCU.

10. The solar powered street-lamp system as claimed in claim 9, wherein each of the first transistor and the N second transistors is an NPN transistor.

11. The solar powered street-lamp system as claimed in claim 9, wherein each electric switch element is an N-MOS transistor.

12. The solar powered street-lamp system as claimed in claim 9, wherein the at least one lamp comprises a plurality of light-emitting diodes (LEDs).

13. The solar powered street-lamp system as claimed in claim 9, wherein the generated one or more control signals are output to the gates of corresponding one or more electric switch elements to individually turn on or turn off the corresponding one or more electric switch elements.

14. The solar powered street-lamp system as claimed in claim 13, wherein the current, 10, supplied from the storage battery to the at least one lamp is regulated in the form of:

$$I0=M*[(V-Vbe)/R]*[\beta/(\beta+1+M)],$$

wherein R is a resistance of the resistor, V is a voltage of the storage battery, Vbe is a voltage difference between the base and the emitter of the first transistor, β is a gain of each second transistor, and M=0, 1, 2, . . . N is the amount of which electric switch elements are turned on.

15. A control circuit for regulating current supplied from a source of power to at least one load to operate in an area thereof responsive to an environmental condition in the area, wherein the source of power has an anode and a cathode being grounded, wherein the at least one load has a first terminal electrically coupled to the anode of the source of power and a second terminal, and wherein the environmental condition comprises a plurality of states, comprising:

a. a current mirror circuit comprising:
      (i) a resistor having a first terminal and a second terminal, wherein the first terminal is connected to the anode of the source of power;
      (ii) a first transistor having a base, a collector and an emitter, wherein the collector is electrically coupled to both the base and the second terminal of the resistor, and the emitter is grounded;
      (iii) N second transistors, N being a positive integer, each second transistor having a base, a collector and an emitter, wherein the base of each second transistor is electrically coupled to the base of the first transistor, and the collector of each second transistor is electrically coupled to a port that is electrically coupled to the second terminal of the at least one load; and
      (iv) N electric switch elements, each electric switch element having a gate, a source and a drain, wherein the drain of each electric switch element is electrically coupled to the emitter of a corresponding second transistor, and the source each electric switch element is electrically coupled to a port that is grounded;
   and
   b. a micro control unit (MCU) at least having N output ports, wherein each output port is electrically coupled to the gate of a corresponding electric switch element.

16. The control circuit as claimed in claim 15, wherein the source of power is rechargeable from a solar energy operated absorption board.

17. The control circuit as claimed in claim 15, wherein the at least one load comprises at least one street lamp.

18. The control circuit as claimed in claim 15, wherein each of the first transistor and the N second transistors comprises an NPN transistor.

19. The control circuit as claimed in claim 15, wherein each of the N electric switch elements is an N-MOS transistor.

20. The control circuit as claimed in claim 15, wherein the MCU is configured such that when the environmental condition in the area changes from one state to another state, the MCU generates one or more control signals selectively outputting to the gates of corresponding one or more electric switch elements to individually turn on or turn off the corresponding one or more electric switch elements, thereby regulating current supplied from the source of power to the at least one load responsive to the environmental condition in the area.

21. The control circuit as claimed in claim 20, wherein each state of the environmental condition is associated with a corresponding period of time in a day.

22. The control circuit as claimed in claim 21, further comprising a timer coupled to the MCU and configured to record the real time in the area, thereby identifying a state of the environmental condition thereof.

23. A control circuit for regulating current supplied from a source of power to at least one load, comprising:

a. a current mirror circuit electrically coupled between the source of power and the at least one load, and being capable of regulating current supplied from the source of power to the at least one load at different levels;
   b. a clock adapted for recording time; and
   c. a micro control unit (MCU) electrically coupled between the clock and the current mirror circuit, and configured such that when time changes from a first time period to a second time period, the MCU receives a time signal from the clock and generates at least one control signal to trigger the current mirror circuit to regulate current supplied from the source of power to the at least one load from a first level corresponding to the first time period to a second level corresponding to the second time period;

wherein the current mirror circuit comprises:

d. a resistor having a first terminal and a second terminal, wherein the first terminal is connected to the source of power and a first terminal of the at least one load;
   e. a first transistor having a base, a collector and an emitter, wherein the collector is electrically coupled to both the base and the second terminal of the resistor, and the emitter is grounded;
   f. N second transistors, N being a positive integer, each second transistor having a base, a collector and an emitter, wherein the base of each second transistor is electrically coupled to the base of the first transistor, and the collector of each second transistor is electrically coupled to a port that is electrically coupled to a second terminal of the at least one load; and
   g. N electric switch elements, each electric switch element having a gate, a source and a drain, wherein the drain of each electric switch element is electrically coupled to the emitter of a corresponding second transistor, and the source of each electric switch element is electrically coupled to a port that is grounded and the gate of each electric switch element is electrically coupled to a corresponding output port of the MCU.

\* \* \* \* \*